United States Patent [19]
Mehta et al.

[11] Patent Number: 5,326,651
[45] Date of Patent: * Jul. 5, 1994

[54] WELDLESS BATTERY PACK WITH WIPING CONTACTS

[75] Inventors: Alay M. Mehta, Plantation; Mark S. Bresin, Coral Springs, both of Fla.

[73] Assignee: Motorola, Inc., Schaumburg, Ill.

[*] Notice: The portion of the term of this patent subsequent to Jan. 19, 2010 has been disclaimed.

[21] Appl. No.: 970,884

[22] Filed: Nov. 3, 1992

[51] Int. Cl.⁵ .................................................. H01M 2/10
[52] U.S. Cl. ........................................ 429/96; 429/98; 429/99; 429/159
[58] Field of Search ................................ 429/96–100, 429/121–123; 307/150; 439/500; 206/333

[56] References Cited

U.S. PATENT DOCUMENTS

| | | | |
|---|---|---|---|
| 4,806,440 | 2/1989 | Hahs, Jr. | 429/100 |
| 5,015,546 | 5/1991 | Dulaney et al. | 429/99 |
| 5,019,465 | 5/1991 | Herron et al. | 429/97 |
| 5,096,788 | 3/1992 | Bresin et al. | 429/99 |
| 5,104,754 | 4/1992 | Dorinski et al. | 429/99 |
| 5,149,602 | 9/1992 | Savovic et al. | 429/96 |
| 5,180,644 | 1/1993 | Bresin et al. | 429/98 |

*Primary Examiner*—Anthony Skapars
*Attorney, Agent, or Firm*—Kenneth M. Massaroni

[57] ABSTRACT

A battery pack (10), comprises at least one cell (16) having a positive (15) and a negative terminal (17), and a header (18) for mounting the cell. The header has at least one wiping contact (20) for connection to either the positive or negative terminal of the cell or cells. The battery pack further comprises a first housing member (30) for receiving the header and the cell or cells, a second housing member (12) mounted above the header and coupled to the first housing member, and a scheme for wiping the wiping contact while the cell (or cells) is enclosed within the first and second housing members.

18 Claims, 2 Drawing Sheets cells 14 retains the cells and provides the electrical interconnection between the cells and other components (not shown) that could be optionally added such as resistors, diodes, or polyswitches. The header 18 has

WELDLESS BATTERY PACK WITH WIPING CONTACTS

TECHNICAL FIELD

This invention relates generally to battery packs in general and, more particularly, to a weldless battery pack having wiping contacts.

BACKGROUND

In weldless battery packs, the cells make pressure contact with springs typically of either formed stamped sheet metal contacts or integrally formed contacts in plastic as illustrated in Dorinski et. al, U.S. Pat. No. 5,104,754. Over a period of time, oxidation or some other forms of contamination or corrosion can cause the contact resistance in the contacts to rise to an unacceptable level. The oxidation can cause insufficient charging capabilities, lower capacity, intermittences and other electrical discrepancies. Typically, an attempt to rectify the oxidation problem includes plating the contacts with an anti-oxidation or anti-corrosion material such as tin. But even so, oxidation persists. A solution could involve the user periodically affirmatively cleaning the contacts by wiping or rubbing the contact, much like a computer technician uses an eraser to remove corrosion on the contacts of a peripheral plug-in board. But such a task would be cumbersome. Thus, a need exists for a weldless battery pack having a means for overcoming the persistent oxidation and corrosion problems described above in a manner that would be transparent to a user.

SUMMARY OF THE INVENTION

A battery pack, comprises at least one cell having a positive and a negative terminal, and a header for mounting the cell. The header has at least one wiping contact for connection to either the positive or negative terminal of the cell or cells. The battery pack further comprises a first housing member for receiving the header and the cell or cells, a second housing member mounted above the header and coupled to the first housing member, and a scheme for wiping the wiping contact while the cell (or cells) is enclosed within the first and second housing members.

DETAILED DESCRIPTION OF THE PREFERRED EMBODIMENT

Figure 1:
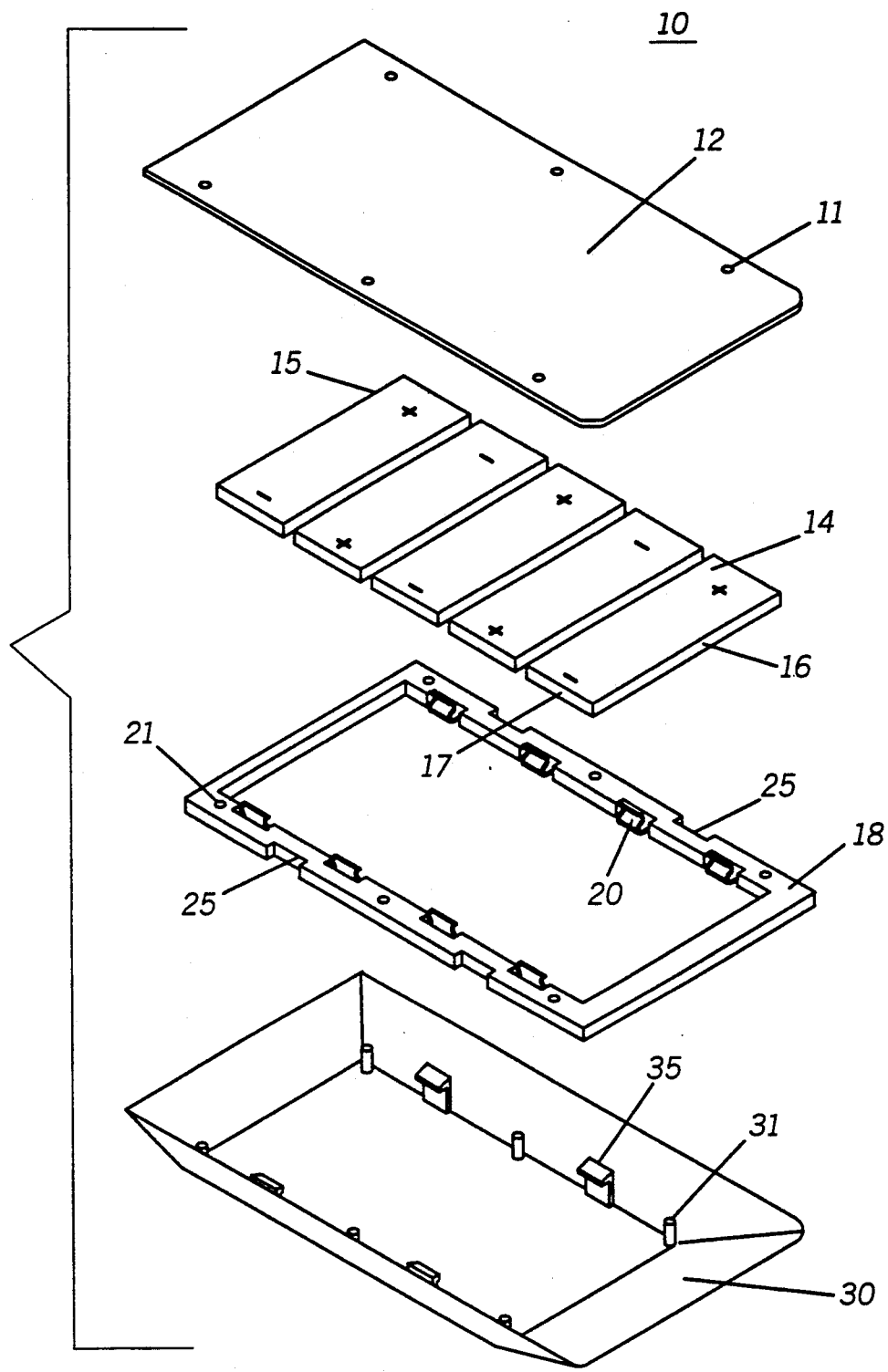
FIG. 1 is an exploded perspective view of a battery pack in accordance with the present invention.

Referring to FIG. 1, there is shown an exploded view of a battery pack 10 in accordance with the present invention. The pack 10 comprises at least one cell 16 (or a plurality of cells (14)), each cell having a positive terminal 15 and a negative terminal 17. The cells themselves are preferably prismatic cells of suitable chemistry such as nickel cadmium, nickel metal hydride, or lithium polymer. Of course, other cell chemistries are suitable and are contemplated within the present invention. A header 18 for mounting the cell 16 or plurality of cells 14 retains the cells and provides the electrical interconnection between the cells and other components (not shown) that could be optionally added such as resistors, diodes, or polyswitches. The header 18 has a spring or wiping contact 20 that allows for wiping when relative motion exists between the header 18 and the cells 16 or plurality of cells 14. The advantage of this structure will become apparent when the operation of the wiping is explained.

The header 18 mounts into a first housing member 30 which receives the header and cells. Once the cells and header is mounted into the first housing member 30, a second housing member 12 covers the cells and header forming the battery pack 10. The second housing member 12 is preferably a plastic laminar cover and optionally can be a label with some rigidity. The second housing member 12 and the header 18 preferably have openings 11 and 21 respectively which are used to provide alignment when a post 31 formed in the first housing member 30 protrudes through the openings during assembly. The first housing member 30 additionally includes a protrusion or arm 35 that allows the header 18 to snap into the first housing member 30. Preferably, the arm 35 snaps into the rectangular or paralleliped shaped void 25 of the header 18 as shown.

Figure 2:
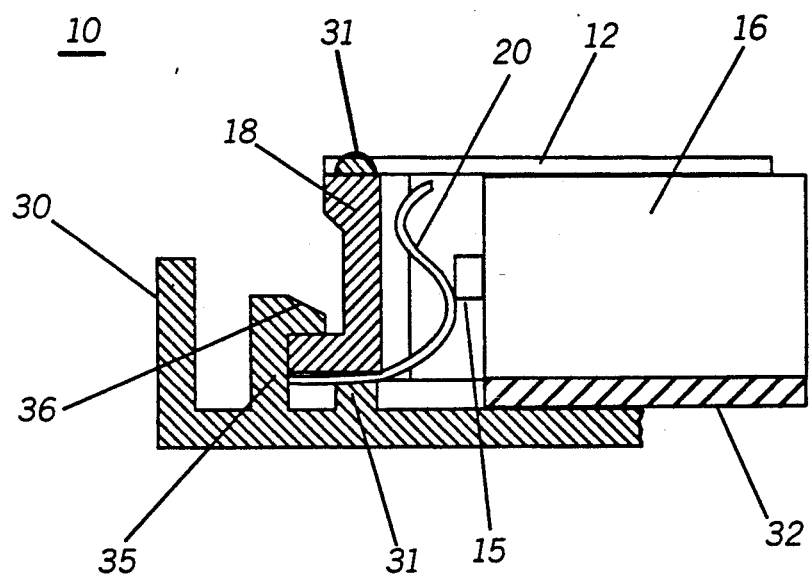
FIG. 2 is a cut view of an assembled battery pack in accordance with the present invention.

Referring to FIG. 2, there is shown a cross-sectional view of the assembled battery pack 10. Again, the housing 30 is shown having the post 31 and the arm 35. The arm 35 has an overhang 36 which allows the header 18 to snap into the housing 30. The terminal 15 of the cell 16 couples to the wiping contact 20 as shown. Finally, the cover or second housing member 12 is mounted above the header and cells within the housing 30. Optionally, a spring means 32 such as a cushion or foam pad is placed under the cell 16 or cells 14. Preferably, the pad 32 has adhesive on its opposing sides.

In operation, the wiping contacts are cleaned generally in one of either two methods that is essentially transparent to a user of the battery pack 10. The wiping of the oxide or corrosion formed on the contact 20 occurs when either the contacts themselves moves and the cells stay stationary or when the cells move and the contacts remain stationary. For example, when the cell is pressed by applying pressure to the cover 12, the cell 16 moves relative to the contact 20. This could easily happen by the mere attachment of the battery to the corresponding portable electronic product such as a two-way radio or cellular phone. Additionally if the user occasionally grabs the battery between the cover 12 and the first housing member 30, compression will occur causing the cell terminal to move relative to the stationary contact which is attached to the header 18. Another method of insuring that relative movement occurs involves the protruding post 31 which preferably protrudes above the cover 12. If the post 31 is compressed as the battery pack 10 is slid or otherwise mounted onto a portable electronic product, then the header and the wiping contacts 20 ideally move a very small pre-designed and controlled distance causing the rubbing action between the contact 20 and the terminal 15. Hence, when the battery pack 10 is slid onto its respective portable product, the oxide or corrosion will be wiped off providing low contact resistance and electrical integrity.

What is claimed is:

1. A battery pack, comprising:
   at least one cell having a positive and a negative terminal;
   a header for mounting said at least one cell, the header having at least one wiping contact for connection to either the positive or negative terminal of the cell or cells;

a first housing member for receiving the header and the cell or cells;

a second housing member mounted above the header and coupled to the first housing member;

means for wiping the wiping contact while the at least one cell is enclosed within the first and second housing members.

2. The battery pack of claim 1, wherein the header snaps into the first housing member.

3. The battery pack of claim 1, wherein the first housing member includes a post for alignment with an opening in the header and an opening in the second housing member.

4. The battery pack of claim 1, wherein the second housing member is a laminar label.

5. The battery pack of claim 1, wherein the means for wiping wipes the wiping contact when the battery pack is attached to a portable product.

6. The battery pack of claim 1, wherein the means for wiping comprises a structure allowing the relative motion between the cell terminals and the wiping contacts.

7. A weldless battery pack, comprising:

a plurality of cells mechanically coupled to each other, each cell having a positive and a negative terminal;

a header for mounting the plurality of cells, the header having at least one integrally formed wiping contact for connection to either the positive or negative terminal of the cell or cells;

a first housing member for receiving the header and the plurality of cells;

a second housing member mounted above the header and coupled to the first housing member;

means for wiping the integrally formed wiping contact.

8. The battery pack of claim 7, wherein the header snaps into the first housing member.

9. The battery pack of claim 7, wherein the first housing member includes a post for alignment with an opening in the header and an opening in the second housing member.

10. The battery pack of claim 7, wherein the second housing member is a laminar label.

11. The battery pack of claim 7, wherein the cells are prismatic cells.

12. The battery pack of claim 7, wherein the means for wiping comprises a structure allowing the relative motion between the cell terminals and the wiping contacts.

13. A weldless battery pack, comprising:

a plurality of prismatic cells mechanically coupled to each other, each cell having a positive and a negative terminal;

a header for mounting the plurality of cells, the header having at least one integrally formed wiping contact for connection to either the positive or negative terminal of the cell or cells;

a first housing member for receiving the header and the plurality of cells;

a second housing member mounted above the header and coupled to the first housing member;

means for wiping the integrally formed wiping contact by applying pressure to either the first housing member or second housing member.

14. The battery pack of claim 13, wherein the header snaps into the first housing member.

15. The battery pack of claim 13, wherein the first housing member includes a post for alignment with an opening in the header and an opening in the second housing member.

16. The battery pack of claim 13, wherein the second housing member is a laminar label.

17. The battery pack of claim 13, wherein the cells are prismatic cells.

18. The battery pack of claim 13, wherein the means for wiping comprises a structure allowing the relative motion between the cell terminals and the wiping contacts.

* * * * *